United States Patent [19]
Elliott et al.

[11] Patent Number: 6,014,736
[45] Date of Patent: Jan. 11, 2000

[54] APPARATUS AND METHOD FOR IMPROVED FLOATING POINT EXCHANGE

[75] Inventors: Timothy A. Elliott; G. Glenn Henry, both of Austin; Albert J. Loper, Jr., Cedar Park, all of Tex.

[73] Assignee: IP First LLC, Fremont, Calif.

[21] Appl. No.: 09/048,524

[22] Filed: Mar. 26, 1998

[51] Int. Cl.[7] ...................................................... G06F 9/38
[52] U.S. Cl. ...................... 712/216; 712/218; 712/222; 712/226
[58] Field of Search .................................. 712/216, 218, 712/222, 226

[56] References Cited

U.S. PATENT DOCUMENTS

| | | | |
|---|---|---|---|
| 5,367,650 | 11/1994 | Sharangpani et al. | 711/221 |
| 5,499,352 | 3/1996 | Clift et al. | 712/217 |
| 5,634,118 | 5/1997 | Blomgren | 712/226 |
| 5,913,047 | 6/1999 | Mahalingalah et al. | 712/213 |

*Primary Examiner*—William M. Treat
*Attorney, Agent, or Firm*—Richard K. Huffman; James W. Huffman

[57] ABSTRACT

A microprocessor is provided for executing a floating point exchange micro instruction sequence to swap the contents a first location and a second location. The microprocessor includes register/control logic that receives a floating point micro instruction, determines that the contents of the first location depend upon resolution of a preceding floating point micro instruction, and provides a signal indicating the dependency. The microprocessor also has interlock logic that, in the event of a dependency forwards a new target location to the preceding floating point micro instruction. The microprocessor also includes target location modification logic that receives the new target location and for provides the new target location to the preceding floating point micro instruction. Modification of the target location allows the floating point exchange micro instruction sequence to execute without resolution delay.

24 Claims, 6 Drawing Sheets

FIG. 3 (Related Art)

CONVENTIONAL FLOATING POINT EXCHANGE /300

| Cycle | Translate | Register | Execute | Write Back |
|---|---|---|---|---|
| 1 | FADD ST(0),ST(1) | -- | -- | -- |
| 2 | FXCH ST(2) | FADD | -- | -- |
| 3 | -- | ST(0),ST(0),ST(1) | FADD | -- |
| 4 | -- | FLD TEMP,ST(0) | ST(0),ST(0),ST(1) | FADD |
| 5 | -- | Stall (FLD) | SLIP | ST(0),ST(0),ST(1) |
| 6 | -- | Stall (FLD) | SLIP | SLIP |
| 7 | -- | FSTR ST(0),ST(2) | FLD TEMP,ST(0) | SLIP |
| 8 | -- | FSTR ST(2),TEMP | FSTR ST(0),ST(2) | FLD TEMP,ST(0) |
| 9 | -- | -- | FSTR ST(2),TEMP | FSTR ST(0),ST(2) |
| 10 | -- | -- | -- | FSTR ST(2),TEMP |

5 CYCLES

FIG. 5

IMPROVED FLOATING POINT EXCHANGE / 500

| Cycle | Translate | Register | Execute | Write Back |
|---|---|---|---|---|
| 1 | FADD ST(0),ST(1) | -- | -- | -- |
| 2 | FXCH ST(2) | FADD | -- | -- |
| 3 | -- | ST(0),ST(0),ST(1) | FADD | -- |
| 4 | -- | FLD TEMP,ST(0) | ST(2),ST(0),ST(1) | FADD |
| 5 | -- | FSTR ST(0),ST(2) | FLD TEMP,ST(0) | ST(2),ST(0),ST(1) |
| 6 |  | FSTR ST(2),TMP | FSTR ST(0),ST(2) | FLD TEMP,ST(0) |
| 7 |  | -- | FSTR ST(2),TMP | FSTR ST(0),ST(2) |
| 8 |  | -- | -- | FSTR ST(2),TMP |

3 CYCLES

APPARATUS AND METHOD FOR IMPROVED FLOATING POINT EXCHANGE

BACKGROUND OF THE INVENTION

1. Field of the Invention

This invention relates in general to the field of instruction execution in computers, and more particularly to an improved apparatus and method for executing a floating point exchange instruction within a microprocessor.

2. Description of the Related Art

A common instruction that is provided within a microprocessor is a floating point exchange instruction. The floating point exchange instruction allows a programmer to specify two operands to be swapped within a floating point register file. This is illustrated by the mnemonic FXCH R1,R2. More specifically, this instruction directs that the contents of a register R1 are to be written into a register R2, and that the contents of the register R2 are to be written into the register R1.

The floating point exchange instruction is widely used because many floating point instructions operate exclusively on an operand that must be present in a particular register in the floating point register file. The floating point exchange macro instruction provides a simple means of moving an operand to that particular register. Furthermore, it is not uncommon for a floating point exchange instruction that specifies an operand in the particular register to immediately follow a preceding floating point computational instruction that prescribes the particular register as a location for storage of its result. When this occurs, the operand specified by the floating point exchange instruction is dependent upon resolution of the preceding floating point computational instruction. That is, the operand specified by the floating point exchange instruction cannot be retrieved for the swap until the preceding floating point computational instruction writes its result back into the particular register.

When a dependency exists as stated above, control logic in the microprocessor typically delays the floating point exchange instruction in the floating point instruction pipeline, and does not allow it to access the particular register until the preceding floating point computational instruction writes its result back into that register. From the standpoint of program execution time, any delay in the instruction pipeline is undesirable. But this resolution delay is further compounded in a program that contains multiple dependent floating point exchanges. The time required to execute such a program is significantly impacted by the resolution delay incurred each time a dependent floating point exchange is executed.

Therefore, what is needed is an apparatus and method that allows a dependent floating point exchange to be executed faster than has heretofore been provided. Additionally, what is needed is an apparatus and method that allows a dependent floating point exchange to be executed without resolution delay. In addition, what is needed is a microprocessor that executes a floating point exchange without resolution delay which requires only minimal additional hardware.

SUMMARY

To address the above-detailed deficiencies, it is an object of the present invention to provide a microprocessor that executes a floating point exchange micro instruction sequence faster than has heretofore been provided.

Accordingly, in the attainment of the aforementioned object, it is a feature of the present invention to provide a microprocessor for executing a floating point exchange micro instruction sequence,. the floating point exchange micro instruction sequence exchanging contents of a first location and a second location. The microprocessor includes register/control logic that receives the floating point exchange micro instruction sequence and determines that the contents of the first locate on depend upon resolution of a preceding floating point micro instruction. The register/control logic provides a signal indicating the dependency. The microprocessor also has interlock logic, coupled to the register/control logic. The interlock logic receives the signal from the register/control logic and forwards a new target location to the preceding floating point micro instruction if the signal indicates the dependency. The microprocessor also has target location modification logic, coupled to the interlock logic. The target location modification logic receives the new target location and provides the new target location to the preceding floating point micro instruction. Forwarding of the new target location by the interlock logic allows the floating point exchange micro instruction sequence to execute without resolution delay.

An advantage of the present invention is that a dependent floating point exchange instruction is not delayed in the floating point pipeline.

Another object of the present invention is to provide a microprocessor that allowed a dependent floating point exchange to be executed without resolution delay.

In another aspect, it is a feature of the present invention to provide a microprocessor for exchanging contents of two locations within a floating point register file. The microprocessor includes register/control logic, interlock logic, target modification logic, and write back logic. The register/control logic receives a floating point exchange micro instruction sequence directing the microprocessor to exchange the contents of a first location and a second location within the floating point register file, determines that the contents of the first location depend upon resolution of a preceding floating point micro instruction, and provide a signal indicating the dependency. The interlock logic is coupled to the register/control logic to receive the signal from the register/control logic, and to forward a new target location to the preceding floating point micro instruction if the signal indicates the dependency. The target location modification logic is coupled to the interlock logic to receive the new target location, and to provide the new target location to the preceding floating point micro instruction. The write back logic is coupled to the interlock logic to receive the new target location, and to write back a result of the preceding floating point micro instruction in the new target location. The write back logic also negates write back of the second location during execution of the floating point exchange micro instruction sequence. Forwarding of the new target location by the interlock logic allows the floating point exchange micro instruction sequence to execute without resolution delay.

Another advantage of the present invention is that a dependent floating point micro instruction sequence does not have to wait for a preceding floating micro instruction to resolve.

Yet another object of the present invention is to provide an apparatus and method to execute a floating point exchange without resolution delay which requires only minimal additional hardware.

In yet another aspect, it is a feature of the present invention to provide a floating point unit in a microprocessor for swapping contents of two floating point registers within a floating point register file. The floating point unit has dependency resolution logic and write back logic. The dependency resolution logic receives a floating point exchange micro instruction sequence directing the floating point unit to exchange contents of a dependent register with contents of a non-dependent register. The dependency resolution logic also determines that the contents of the dependent location depend upon resolution of a preceding floating point micro instruction, and, if the contents of the dependent location depend upon resolution of a preceding floating point micro instruction, the dependency resolution logic forwards a new target location to the preceding floating point micro instruction. The write back logic is coupled to the dependency resolution logic to receive the new target location, and to write a result of the preceding floating point micro instruction to the new target location. The new target location is the non-dependent location, and thereby allows the floating point exchange instruction sequence to execute prior to resolution of the preceding floating point micro instruction.

In a further aspect, it is a feature of the present invention to provide a method for executing a floating point exchange micro instruction sequence to exchange contents of two locations within a floating point register file, where the floating point exchange micro instruction sequence specifies a dependent location, and where the contents of the dependent location depend upon resolution of a preceding floating point micro instruction. The method includes detecting execution of the floating point exchange micro instruction sequence, retrieving contents of a non-dependent location from the floating point register file, forwarding the non-dependent location as a new target address to the preceding floating point micro instruction, during write back of the preceding floating point micro instruction, storing its results in the non-dependent location rather than the dependent location, and during write back of the floating point exchange micro instruction sequence, storing the contents of the non-dependent location in the dependent location.

Another advantage of the present invention is that costly hardware additions to perform register mapping are not required.

BRIEF DESCRIPTION OF THE DRAWINGS

These and other objects, features, and advantages of the present invention will become better understood with regard to the following description, and accompanying drawings where:

FIG. 3 is a table illustrating execution of a floating point exchange macro instruction by the floating point unit of FIG. 2.

FIG. 5 is a table illustrating execution of a floating point exchange macro instruction by the floating point unit of FIG. 4.

DETAILED DESCRIPTION

Figure 1:
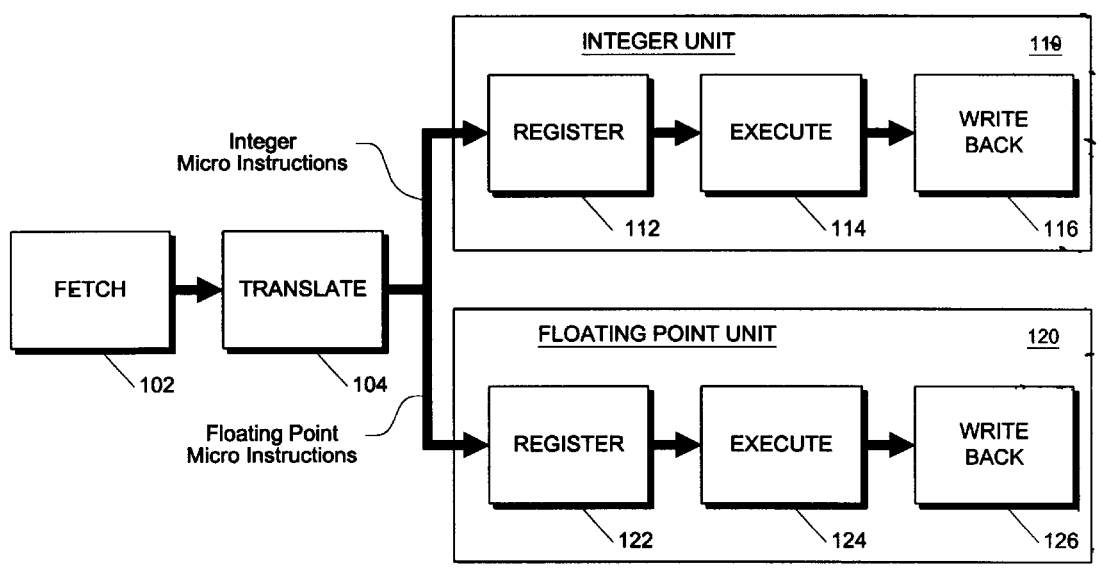
FIG. 1 is a block diagram of a related art pipeline microprocessor.

Referring to FIG. 1, a block diagram of a related art pipeline microprocessor 100 is presented. The microprocessor 100 includes a fetch stage 102, a translate stage 104, an integer unit 110, and a floating point unit 120. The floating point unit 120 is in parallel with the integer unit 110. The integer unit 110 has three stages: register 112, execute 114, and write back 116. The floating point unit 120 has three stages: register 122, execute, 124, and write back 126.

Operationally, the fetch stage 102 fetches macro instructions from memory (not shown) that are to be executed by the microprocessor 100. The trans late stage 104 translates, or decodes, a fetched macro instruction into a sequence of micro instructions, each directing the microprocessor to perform a specific subtask related to accomplishment of an overall operation specified by the fetched macro instruction. Because of fundamental differences between operations involving integers and operations involving floating point numbers, microprocessor designers have historically segregated hardware and macro instructions for the performance of integer subtasks from that for the performance of floating point subtasks. Early microprocessors reflect this segregation to the extreme: floating point subtasks were performed by an entirely separate device, known as a numeric compressor. Although a present day microprocessor 100 features floating point device logic that is integrated into the same chip, it accomplishes floating point subtasks in the same manner as the early microprocessors: floating point logic and associated macro instructions remain segregated, albeit on the same chip.

Thus, the translate stage 104 decodes a floating point macro instruction into a sequence of floating point micro instructions to accomplish a specified floating point operation. Similarly, the translate stage 104 decodes an integer macro instruction into a sequence of integer micro instructions to accomplish a specified integer operation. The integer micro instructions are passed from the translate stage 104 to the integer unit register stage 112. The register stage 112 retrieves operands specified by the integer micro instructions from a register file (not shown) for use by later stages in the pipeline. The integer unit execute stage 114 executes subtasks specified by the integer micro instructions. Example subtasks performed by the execute stage 114 include address calculation, integer arithmetic, and retrieval of data from memory. The integer unit write back stage 116 writes results of the executed subtasks back into the register file, or to a memory location.

Likewise, the floating point micro instructions are passed from the translate stage 104 to the floating point unit register stage 122. The floating point unit register stage 122 retrieves operands prescribed by the floating point micro instructions from a floating point register file (not shown), for use by later stages in the floating point pipeline. The floating point unit execute stage 124 executes floating point subtasks specified by the floating point macro instructions. Examples of subtasks performed by the execute stage 124 include floating point arithmetic, square root, and transcendental functions (i.e., sine, cosine, etc.). The floating point unit write back stage 126 writes results of the execute d subtasks back into the floating point register file.

Micro instructions move through successive stages of the microprocessor pipeline in synchronization with a microprocessor clock. Optimally, while any given stage in the pipeline is executing a micro instruction, the previous stage should be executing the next micro instruction. If a micro instruction within one stage requires more than one cycle to completely execute, then subsequent micro instructions are stalled until execution of that micro instruction is completed. When a stall occurs, pipeline slips are inserted into the pipeline to insure that the subsequent micro instructions do not prematurely advance in the pipeline.

Figure 2:
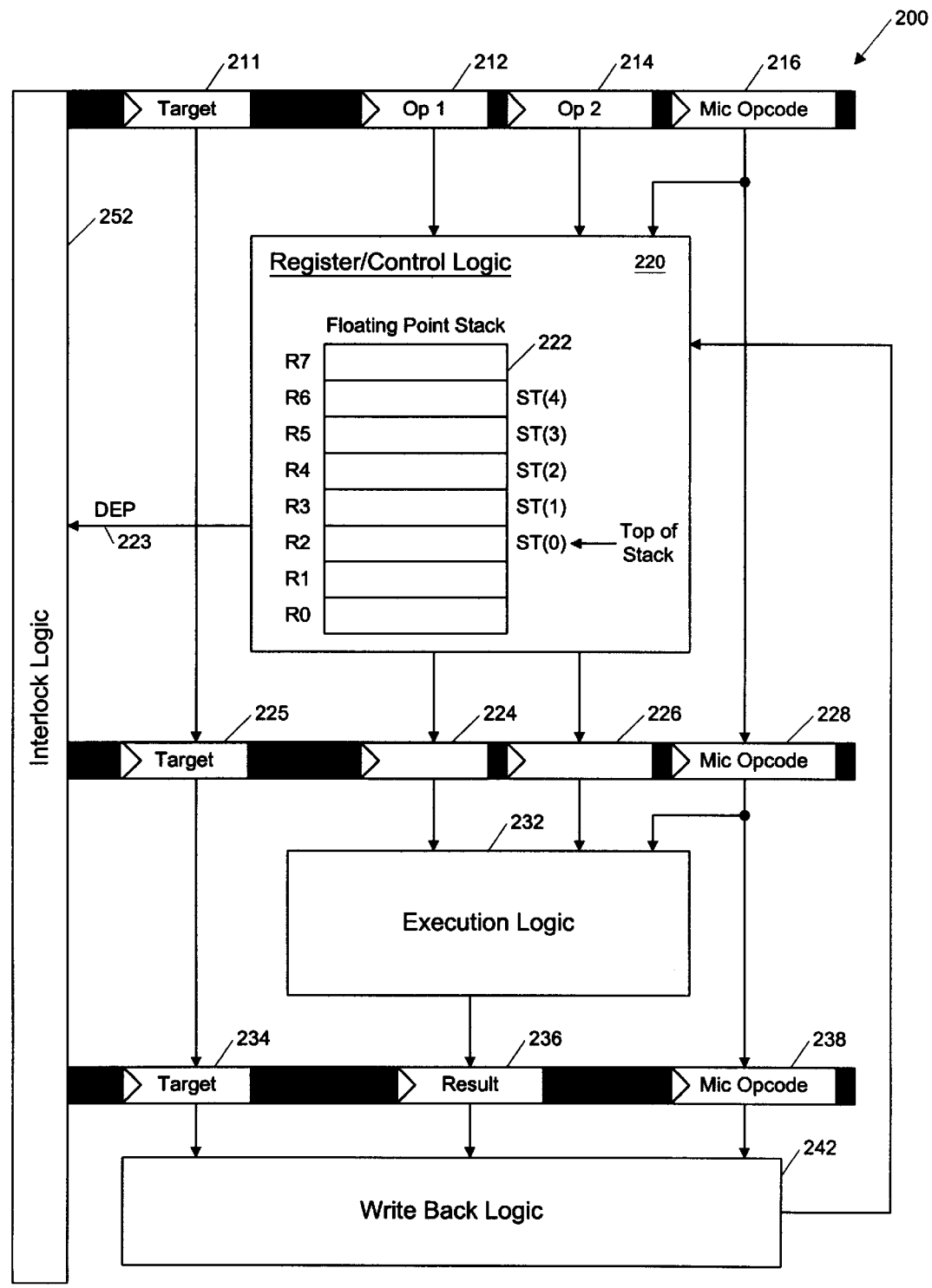
FIG. 2 is a block diagram of a floating point unit within the related art pipeline microprocessor of FIG. 1.

Now referring to FIG. 2, a block diagram of a floating point unit 200 within the related art pipeline microprocessor 100 of FIG. 1 is presented. The floating point unit 200 has a first operand buffer 212, a second operand buffer 214, and a micro opcode buffer 216, each of which is connected to register/control logic 220. The register/control logic 220 has a floating point register file 222, also called a floating point stack 222. The register/control logic 220 has outputs connected to a first operand register 224 and a second operand register 226. The floating point unit 200 also includes execution logic 232 that is connected to the first operand register 224, the second operand register 226, and a micro opcode register 228. The execution logic 232 provides an output to a result register 236. The floating point unit 200 also includes write back logic 242 that is connected to the result register 236 and a result target register 234. The floating point unit further has interlock logic 252 that is coupled to each stage in the floating point unit pipeline.

Architecturally, a floating point micro instruction consists of several fields: a micro opcode, a first operand, a second operand, and a target location. In operation, when a floating point micro instruction proceeds from the translate stage 104, the micro opcode is placed in the micro opcode buffer 216, the first operand is placed in the first operand buffer 212, the second operand is placed in the second operand buffer 214, and the target location is placed in the target location buffer 211. The micro opcode identifies the subtask to be executed. The first operand is either data to be directly used in the computation specified by the micro opcode, or it specifies a location in the floating point stack that contains data to be used in the computation. The specification of the location is relative to the top of the stack. The second operand always specifies a location relative to the top of the stack that contains data to be used in the computation. The target location specifies a location relative to the top of the stack for storage of the result of the computation. For example, the micro instruction FADD ST(2),ST(0),ST(1) prescribes that the contents of location 1 relative to the top of the stack (register 3 in the floating point stack 222 of FIG. 2) be added to the contents of relative location 0 (register 2 in the floating point stack 222). The result of the addition is to be stored in relative location 2 (register 4 in the floating point stack 222).

The register/control logic 220 retrieves the specified data from the floating point stack 222. The specified data is placed into the first and second operand registers 224, 226. The target location is directly passed to the next stage in register 225 along with the micro opcode in register 228.

The execution logic 232 performs the computation specified by the micro opcode using the data provided in the first and second operand registers 224, 226. The result of the computation is provided to the result register 236. As with the previous stage, the target location is directly passed to the next stage in the result target register 234 along with the micro opcode in register 238.

The write back logic 242 writes the contents of the result register 236 to the target location in the floating point stack 222 specified by the contents of the result target register 234.

The interlock logic 252 monitors floating point micro instructions as they proceed through the stages of the floating point pipeline to insure that operands are not retrieved from locations in the floating point register file 222 that contain invalid data. For example, if a first micro instruction prescribes operands in locations ST(0) and ST(1) and a target location of ST(2), then the operands are retrieved from the floating point stack 222 and are passed to the execution logic 232. If a second micro instruction, following the first micro instruction, specifies ST(2) as an operand, then the register/control logic 220 will provide a signal 223 to the interlock logic 252 indicating that ST(2) is dependent upon resolution of the preceding micro instruction, i.e., the first micro instruction. This is because the contents of ST(2) in the floating point stack 222 are not valid until the first micro instruction is resolved, that is, until a result of the first micro instruction is written back into ST(2) by the write back logic 242. If the signal 223 indicates that a dependency exists, then the interlock logic 252 will delay execution of the second micro instruction until the preceding micro instruction (i.e., the first micro instruction) is resolved. The interlock logic 252 delays execution of the second micro instruction by inserting slips into the pipeline. When the preceding micro instruction is resolved, then the interlock logic 252 allows the second micro instruction to retrieve the contents of ST(2) from the floating point stack 222. The time that the second micro instruction is delayed is called resolution delay. With the above background on delayed execution of floating point micro instructions in a floating point unit 200, a problem associated with execution of a widely used floating point macro instruction is discussed with reference to FIG. 3.

In FIG. 3, a table 300 is presented illustrating execution of a floating point exchange macro instruction by the floating point unit 200 of FIG. 2. The floating point exchange micro instruction is designated FXCH ST(2) and is shown in the Translate column of the table 300. More specifically, FXCH ST(2) specifies that the contents of location ST(2) in the floating point register file 222 are to be exchanged with the contents of location ST(0). Note that ST(0) is implicitly specified by the floating point exchange macro instruction. In the table 300, instructions that precede and follow instructions of interest are designated by "--". Progression of instructions through each stage of the pipeline is shown with respect to cycles of a microprocessor clock.

As discussed earlier, data associated with floating point instructions are typically transferred to and from the floating point unit 200 via the floating point stack 222. However, a floating point operand can be passed directly to the floating point unit 200, though only a portion of the instructions in a floating point instruction set provide for direct transfer of operands. Indeed, many floating point instructions only execute on operands that are resident in the floating point stack 222. Furthermore, some floating point instructions restrict the location of operands within the floating point stack 222 to specific locations relative to the top of stack. For example, a square root instruction in the x-86 instruction set, FSQRT, implicitly specifies the top of the stack, ST(0), as the location for the source operand and also as the target location for the result of the square root computation.

Because many floating point instructions restrict the location of their associated operands, the floating point exchange macro instruction is widely used to swap the contents of two locations in the floating point register file 222. The floating point exchange macro instruction is a simple means of moving an operand to the top of the floating point stack 222 so that it can be operated on by those floating point instructions that operate only on operands at the top of the stack 222.

During cycle 1, a floating point add macro instruction proceeds through the translate stage of a microprocessor containing the floating point unit 200. The floating point add macro instruction is designated FADD ST(0),ST(1) and is of the common form FADD DESTINATION,SOURCE. In this form, SOURCE specifies the location of a first operand and DESTINATION designates the location of a second operand. In addition, DESTINATION designates the target location. Hence, FADD ST(0),ST(1) specifies that the contents of stack locations ST(0) and ST(1) be added together and the result of the addition is to be stored in target location ST(0). During this cycle, the floating point add macro instruction is translated into a floating point add micro instruction to accomplish the specified operation. The fields of the floating point add micro instruction are placed in buffers 211, 212, 214, and 216.

During cycle 2, the floating point add micro instruction proceeds through the register stage. The floating point add macro instruction is designated FADD ST(0),ST(0),ST(1) and is of the form FADD TARGET,OP1,OP2. More specifically, the instruction specifies that the contents of relative locations ST(0) and ST(1) are to be added together, and the result of the addition is to be placed in target location ST(0). Hence, during cycle 2, the micro opcode, FADD, is forwarded to the micro opcode register 228 and the target location, ST(0), is forwarded to the target location register 225. The contents of location ST(0), along with the contents of location ST(1), are retrieved from the floating point stack 222 and are placed in register 224 and register 226, respectively. Also during cycle 2, the floating point exchange macro instruction, FXCH ST(2), proceeds through the translate stage of the microprocessor. Therein, it is decoded into a sequence of three associated micro instructions to accomplish the exchange.

During cycle 3, the floating point add micro instruction proceeds through the execute stage. The contents of registers 224 and 226 are added in the execution logic 232 and the result of the addition is placed in the result register 236. In addition, the target location, ST(0), is forwarded to the result target register 234. The micro opcode, FADD, is forwarded to register 238. Also during cycle 3, the first micro instruction in the floating point exchange sequence, FLD TEMP, ST(0), proceeds through the register stage. The first micro instruction directs that the contents of ST(0) be loaded into a temporary register, TEMP (not shown). The register/control logic 220 detects that location ST(0) is dependent upon resolution of the preceding floating point add micro instruction. Hence, the register/control logic 220 provides the signal 223 to the interlock logic 252 indicating the dependency. At this point, the interlock logic 252 stalls the floating point exchange micro instruction sequence in the register stage until the result of the preceding floating point add micro instruction is written back into location ST(0), thus resolving the dependency.

During cycle 4, the floating point add micro instruction proceeds through the write back stage. The write back logic 242 stores the contents of the result register 236 in the target location, ST(0), specified by the contents of the result target register 234. At this point, execution of the preceding floating point add micro instruction has completed and the contents of location ST(0) are resolved. Also, during cycle 4, a first slip, provided by the execution logic 252, proceeds through the execute stage because the first micro instruction is stalled in the register stage. In the table 300, Stall(FLD) designates that the first micro instruction, FLD TEMP,ST(0), is stalled in the register stage.

During cycle 5, the first slip proceeds through the write back stage. Also during cycle 5, a second slip proceeds through the execute stage because the first micro instruction is still pending in the register stage. However, since the preceding floating point add micro instruction resolved the contents of ST(0) during cycle 4, in cycle 5 the first micro instruction in the floating point exchange micro instruction sequence completes its operation in the register stage: cortents of location ST(0) are retrieved from the floating point stack 222 and are placed in the temporary register, TEMP.

During cycle 6, the second slip proceeds through the write back stage. Also during cycle 6, the first micro instruction in the floating point exchange sequence proceeds through the execute stage. In addition during cycle 6, a second micro instruction in the floating point exchange micro instruction sequence, FSTR ST(O),ST(2), proceeds through the register stage. The second micro instruction directs that contents of ST(2) are to be stored in location ST(0). Hence, during cycle 6, the contents of location ST(2) in the floating point register file 222 are retrieved and placed in the first operand register 224. Target location ST(0) is placed in register 225.

During cycle 7, the first micro instruction in the floating point exchange micro instruction sequence proceeds through the write back stage. Also during cycle 7, the second micro instruction proceeds through the execute stage. Contents of the first operand register 224 are transferred to result register 236 and target location ST(0) is placed in the result target register 234. Also during cycle 7, a third micro instruction in the floating point exchange micro instruction sequence, FSTR ST(2),TEMP, proceeds through the register stage. Therein, contents of the temporary register, TEMP, are retrieved and placed in the first operand register 224 and target location ST(2) is placed in register 225.

During cycle 8, the second micro instruction proceeds through the write back stage. Therein, the contents of the result register 236 (i.e., original contents of location ST(2)) are written back into location ST(0). Also during cycle 8, the third micro instruction proceeds through the execute stage. Therein, the contents of TEMP are transferred to result register 236 and target location ST(2) is transferred to the result target register 234.

During cycle 9, the third micro instruction in the floating point exchange micro instruction sequence proceeds through the write back stage. Therein, the contents of the result register 236 (i.e., the contents of ST(0) following resolution of the preceding floating point add micro instruction) are written back into location ST(2), thereby completing the floating point exchange.

Execution of the floating point exchange micro instruction s equence takes five cycles of the microprocessor clock. Furthermore, the first micro instruction in the sequence was stalled in the register stage for two additional clock cycles. This is because its operand, ST(0), was dependent upon resolution of the preceding floating point add micro instruction. Resolution delay is incurred each time a floating point exchange is executed that specifies a dependent operand. Because floating point exchanges are widely used, the cumulative effect of frequent resolution delays significantly impacts program execution time. Those skilled in the art will appreciate that this is a notable problem. The introduction of resolution delay to perform a floating point exchange adversely impacts the time required to execute any software program on the microprocessor. Any manner of avoiding or even reducing this resolution delay will improve the execution time of a typical software program.

One conventional technique used to reduce the delay associated with dependency resolution is called register renaming, register mapping, or register remapping. Under this technique, dedicated hardware in a floating point register stage dynamically maps fixed floating pointer register file locations to associated floating point stack locations. For example, in FIG. 2, eight registers are shown in the floating point stack 222. They are designated R0 through R7. In a microprocessor that incorporates register remapping, each time a micro instruction proceeds through the register stage, potential dependencies are avoided by assigning different stack locations to one or more of the registers. While register remapping does offer a workable solution to the dependency problem, the penalties associated with the solution are prohibitive. Hardware to perform register remapping adds complexity to the design of a microprocessor. Complexity primarily results in increased cost and power consumption. Moreover, register remapping requires that all micro instructions proceed through the dedicated hardware (i.e., a register map) as they advance through the floating point pipeline. While this technique reduces dependency delays, it introduces an overall delay in the processing of every floating point micro instruction, to include those that do not specify dependent operands. One skilled in the art will concur that, while register remapping is a workable solution to the dependency delay problem, an alternative solution that does add complex hardware to the design of a microprocessor is far more desirable. The problem associated with resolution delay incurred from execution of a dependent floating point exchange is addressed by the present invention.

Figure 4:
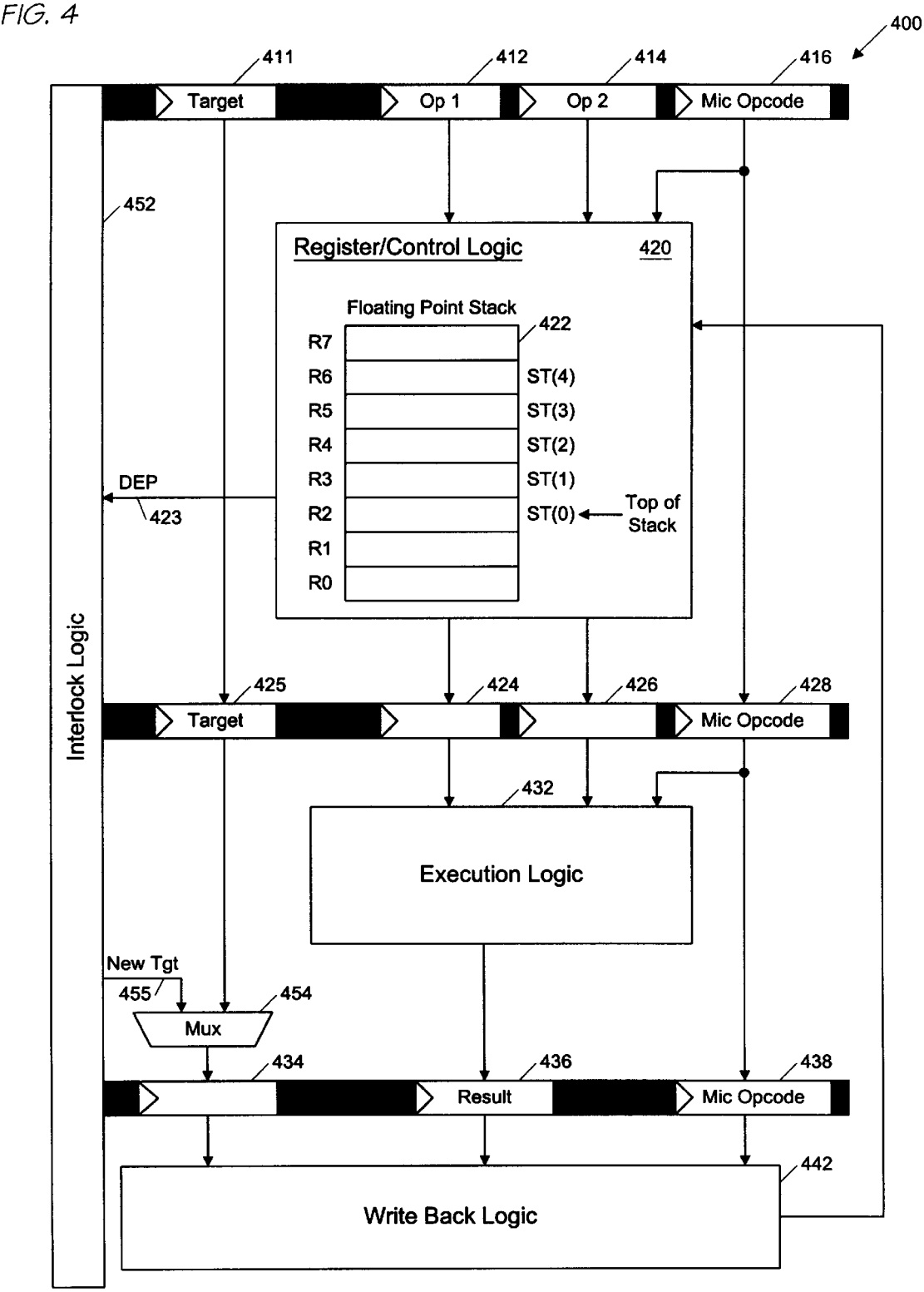
FIG. 4 is a block diagram of a floating point unit within a microprocessor incorporating an embodiment of the present invention.

Now referring to FIG. 4, a block diagram of a floating point unit 400 within a microprocessor incorporating an embodiment of the present invention is presented. The floating point unit 400 has a first operand buffer 412, a second operand buffer 414, and a micro opcode buffer 416, each of which is connected to register/control logic 420. The register/control logic 420 has a floating point register file 422. The register/control logic 420 has outputs connected to a first operand register 424 and a second operand register 426. The floating point unit 400 also includes execution logic 432 that is connected to the first operand register 424, the second operand register 426, and a micro opcode register 428. The execution logic 432 provides its result to a result register 436. The floating point unit 400 also includes write back logic 442 that is connected to the result register 436 and a result target register 434. The floating point unit further has interlock logic 452 that is coupled to each stage in the microprocessor pipeline. The present invention includes target location modification logic 454 that is connected to the interlock logic 452. That target location modification logic 454 provides an output to the result target register 434.

Elements of the floating point unit 400 operate in the same manner as like elements of the conventional floating point unit 200. Like elements have like references, the hundreds digit being replaced with a 4. The present invention, however, operates differently in the case of a dependent floating point exchange. Normally, the interlock logic 452 monitors floating point micro instructions as they proceed through the stages of the floating point pipeline to insure that operands are not retrieved from locations in the floating point register file 422 that contain invalid data. If a given micro instruction specifies contents of a first location within the floating point register file 422 that depends upon resolution of a preceding micro instruction (i.e., the first location is a dependent register), then the resolution/control logic 420 will provide a signal 423 to the interlock logic 452 indicating a dependency. In turn, the interlock logic 452 will stall the instruction by providing slips in the pipeline until the preceding micro instruction resolves. In the case of a floating point exchange that directs the microprocessor to swap the contents of two locations within the floating point register file 244, a dependent registers and a non-dependent register, the interlock logic 452 will not stall the associated floating point exchange micro instruction sequence. Instead of waiting until a preceding floating point micro instruction resolves the dependent register, the interlock logic 452 forwards the location of the non-dependent register to the preceding micro instruction for use as a new target location. The target modification logic 454 provides the non-dependent register location as a new target location for the result of the preceding micro instruction. In the embodiment shown in FIG. 4, the target location modification logic 454 consists of a 2-way mux. When the preceding micro instruction proceeds through the write back stage, the contents of the result register 436 are written into the non-dependent register rather than the dependent register. Because of this target location modification, a floating point exchange micro instruction sequence is allowed to execute without resolution delay.

In the embodiment shown in FIG. 4, the dependency condition is detected and indicated by the register/control logic 420. A new target location for the preceding micro instruction is substituted for an original target location via the interlock logic 454 in conjunction with the target modification logic 454. In another embodiment, dedicated dependency resolution logic (not shown) may directly detect the dependent floating point exchange and forward the new target location to the preceding micro instruction. Detection of the floating point exchange and modification of the target location are more completely described with reference to FIG. 5.

In FIG. 5, a table 500 is presented illustrating execution of a floating point exchange macro instruction by the floating point unit 400 cf FIG. 4. The floating point exchange macro instruction is designated FXCH ST(2) and is shown in the Translate column of the table 400. More specifically, FXCH ST(2) specifies that the contents of location ST(2) in the floating point register file 422 are to be exchanged with the contents of location ST(0). In the table 500, instructions that precede and follow instructions of interest are designated by "--". Progression of instructions through each stage of the pipeline is shown with respect to cycles of a microprocessor clock.

During cycle 1, a floating point add macro instruction proceeds through the translate stage of a microprocessor containing the floating point unit 200. The floating point add macro instruction is designated FADD ST(0) ,ST(1). It directs the floating point unit 200 to add contents of relative locations ST(0) and ST(1) and store a result of the addition in target location ST(0). During this cycle, the floating point add macro instruction is translated into a floating point add micro instruction to accomplish the specified operation. The fields of the floating point add micro instruction are placed in buffers 411, 412, 414, and 416.

During cycle 2, the floating point add micro instruction proceeds through the register stage. The floating point add macro instruction is designated FADD ST(0),ST(0),ST(1) and directs the floating point unit 200 to add the contents of locations ST(0) and ST(1) and store the result in target location ST(0). Hence, during cycle 2, the micro opcode, FADD, is provided to the micro opcode register 428 and the target location, ST(0), is provided to the target location register 425. The contents of location ST(0), along with the contents of location ST(1), are retrieved from the floating point stack 422 and are placed in register 424 and register 426, respectively. Also during cycle 2, the floating point exchange macro instruction, FXCH ST(2), proceeds through the translate stage of the microprocessor. Therein, it is decoded into a sequence of three associated micro instructions to accomplish the exchange.

During cycle 3, the floating point add micro instruction proceeds through the execute stage. The contents of registers 424 and 426 are added in the execution logic 432 and the result of the addition is placed in the result register 436. In addition, the target location, ST(0), is provided to the target location modification logic 454, and the micro opcode, FADD, is provided to register 438. Also during cycle 3, the first micro instruction in the floating point exchange sequence, FLD TEMP,ST(0), proceeds through the register stage. The instruction directs that the contents of ST(0) be loaded into a temporary register, TEMP (not shown). The register/control logic 420 detects that location ST(0) is dependent upon resolution of the preceding floating point add micro instruction. Hence, the register/control logic 420 provides the signal 423 to the interlock logic 452 indicating the dependency. At this point, however, the interlock logic 452 does not stall the floating point exchange micro instruction sequence in the register stage. Rather, it forwards the location of the non-dependent register in the floating point exchange, ST(2), to the target modification logic 454. The target modification logic provides ST(2) to the result target register 434 as the new target for the floating point add micro instruction rather than the original target location, ST(0). In addition, contents of location ST(0) are retrieved from the floating point stack 422 and are placed in the temporary register, TEMP.

During cycle 4, the floating point add micro instruction proceeds through the write back stage. The write back logic 442 stores the contents of the result register 436 in the new target location, ST(2). At this point, execution of the floating point add micro instruction has completed. Also, during cycle 4, a second micro instruction in the floating point exchange micro instruction sequence, FSTR ST(0),ST(2), proceeds through the register stage. The instruction designates that contents of ST(2) are to be stored in location ST(0). Hence, during cycle 4, the contents of location ST(2) in the floating point register file 422 are retrieved and placed in the first operand register 424. Target location ST(0) is placed in register 425. Retrieval of the contents of ST(2) by the second micro instruction occurs prior to the write back of ST(2) by the floating point add micro instruction.

During cycle 5, the first micro instruction in the floating point exchange micro instruction sequence proceeds through the write back stage. Also during cycle 5, the second micro instruction proceeds through the execute stage. Contents of the first operand register 424 (i.e., contents of ST(2)) are transferred to result register 436. Target location ST(0) is routed to the result target register 434 by the target location modification logic 454. Also during cycle 5, a third micro instruction in the floating point exchange micro instruction sequence, FSTR ST(2),TEMP, proceeds through the register stage. Therein, contents of the temporary register, TEMP, are retrieved and placed in the first operand register 424 and target location ST(2) is placed in register 425.

During cycle 6, the second micro instruction proceeds through the write back stage. Therein, the original contents of location ST(2) are written back into location ST(0) based upon the contents of the result register 436 and the result target register 434. Also during cycle 6, the third micro instruction proceeds through the execute stage. Therein, the contents of TEMP are transferred to result register 436 and target location ST(2) is provided to the result target register 434 via the target location modification logic 454.

During cycle 7, the third micro instruction in the floating point exchange micro instruction sequence proceeds through the write back stage. Because the move of the contents of ST(0) to location ST(2) has already been affected by for-warding ST(2) as a new target location for the floating point add micro instruction, the write back logic 442 negates the write back of the third micro instruction to location ST(2). At this point, execution of the floating point exchange micro instruction sequence is complete.

In contrast to that shown in FIG. 2, execution of a floating point exchange micro instruction sequence in accordance with the present invention only requires three cycles of the microprocessor clock. Because the non-dependent register is forwarded to the preceding floating point add micro instruction as a new target location, the floating point exchange micro instruction sequence is allowed to execute without resolution delay.

Figure 6:
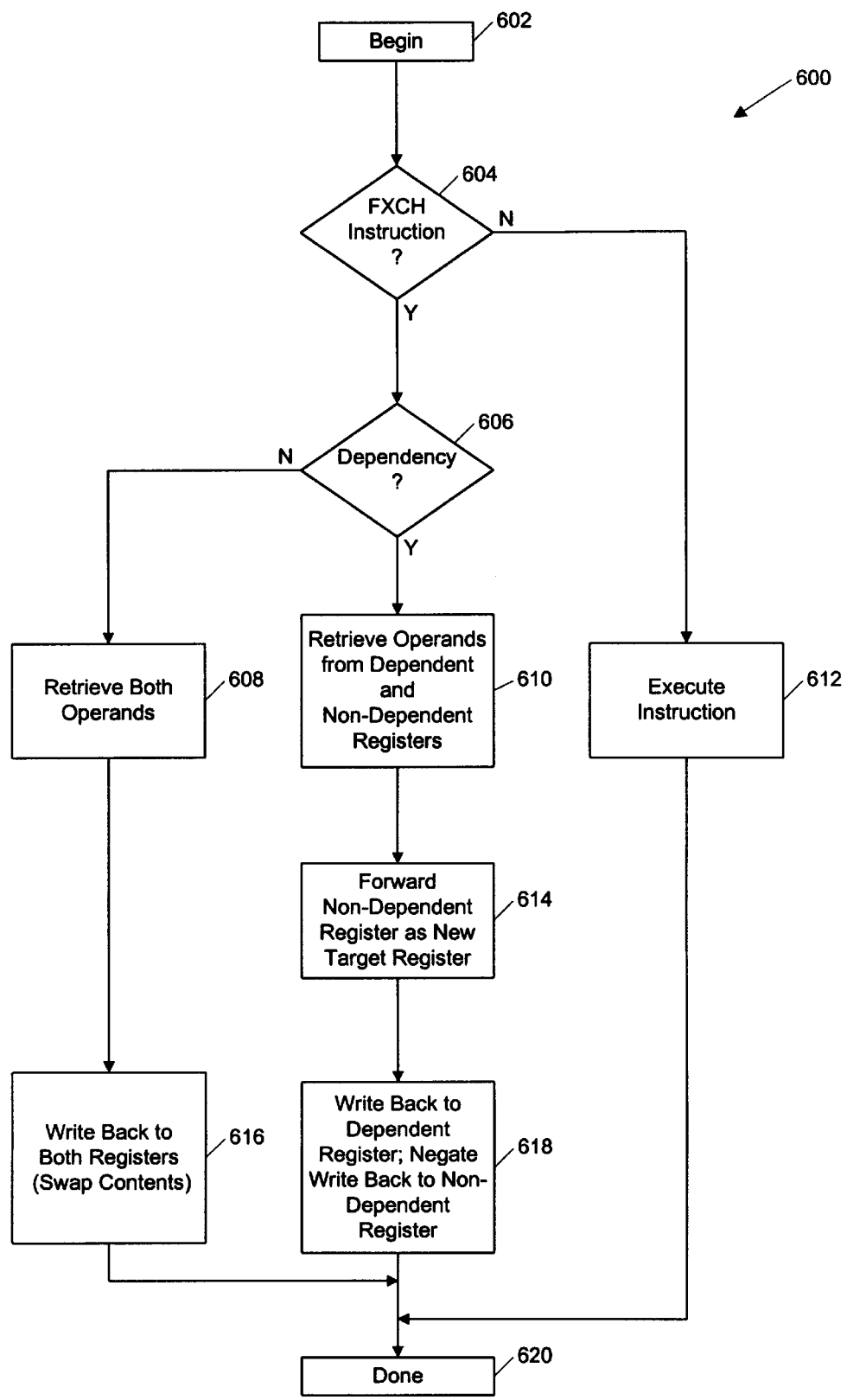
FIG. 6 is a flow chart illustrating the method according to the present invention for executing a floating point exchange.

Now referring to FIG. 6, a flow chart 600 is presented that illustrates a method for executing a floating point exchange macro instruction according to the present invention.

The method begins at blocs 602 and proceeds to decision block 604.

At decision block 604, it is determined whether a current instruction is a floating point exchange macro instruction. If not, then flow proceeds to block 612. If so, then flow proceeds to decision block 606.

At block 612, because it is not a floating point exchange macro instruction, the current instruction is executed. Flow then proceeds to block 620.

At decision block 606, it is determined whether the floating point exchange macro instruction references a dependent register in a floating point register file. If not, then flow proceeds to block 608. If so, then flow proceeds to block 610.

At block 608, both operands specified by the floating point exchange macro instruction are retrieved from the floating point register file. Flow then proceeds to block 616.

At block 616, contents of the both operand registers are swapped when written back into the floating point register file. Flow then proceeds to block 620.

At block 610, because the floating point exchange macro instruction references a dependent register in the floating point register file, operards are retrieved from the dependent register and the non-dependent register. Flow then proceeds to block 614.

At block 614, the location of the non-dependent register is forwarded as a new target location to a preceding floating point micro instruction. Because the non-dependent register is the new target location for the preceding floating point micro instruction, thereby causing a result of the preceding floating point micro instruction to be written to the non-dependent register. Flow then proceeds to block 618.

At block 618, during write back for the floating point exchange micro instruction sequence, the contents of the non-dependent register are written into the dependent register. In addition, because the non-dependent register has already been written by the preceding floating point micro instruction, write back to the non-dependent register during execution of the floating point exchange micro instruction sequence is negated. Flow then proceeds to block 620.

At block 620, the method completes.

Although the present invention and its objects, features, and advantages have been described in detail, other embodiments are encompassed by the invention. For example, the present invention has been described with reference to floating point unit in a microprocessor. However, it is entirely within the scope of this invention for the floating point unit to be part of any other type of digital logic device such as digital signal processor, a numeric processor, or the like.

In addition, the present invention has been specifically characterized in terms of a floating point exchange. But the present invention is also applicable to dependent exchanges in an integer register file in a microprocessor.

Furthermore, future improvements to processing systems may allow writing back of more than two operands/results at a time to a floating point register file. The present invention anticipates such improvements.

Those skilled in the art will appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A microprocessor for executing a floating point exchange micro instruction sequence, the floating point exchange micro instruction sequence exchanging contents of a first location and a second location, the microprocessor comprising:

register/control logic, for receiving the floating point exchange micro instruction sequence, for determining that the contents of the first location depend upon resolution of a preceding floating point micro instruction, and for providing a signal indicating said dependency;

interlock logic, coupled to said register/control logic, for receiving said signal from said register/control logic, and for forwarding a new target location to said preceding floating point micro instruction if said signal indicates said dependency; and target location modification logic, coupled to said interlock logic, for receiving said new target location, and for providing said new target location to said preceding floating point micro instruction;

wherein forwarding of said new target location by said interlock logic allows the floating point exchange micro instruction sequence to execute without resolution delay.

2. The microprocessor as recited in claim 1, wherein the first location and the second location are within a floating point register file within said register/control logic.

3. The microprocessor as recited in claim 2, wherein, during execution of the floating point exchange micro instruction sequence, the contents of the first and second locations are retrieved from said floating point register file.

4. The microprocessor as recited in claim 2, wherein said interlock logic delays the execution of a second micro instruction having an operand that depends upon resolution of a first micro instruction until said first micro instruction is resolved.

5. The microprocessor as recited in claim 4, wherein said first micro instruction is resolved when results of an operation specified by said first micro instruction are written back into said floating point register file so that said operand is valid for use by said second micro instruction.

6. The microprocessor as recited in claim 1, wherein, prior to execution of the floating point exchange micro instruction sequence, the contents of the first location are dependent upon resolution of said preceding floating point micro instruction.

7. The microprocessor as recited in claim 6, wherein prior to execution of the floating point exchange micro instruction sequence, the contents of the second location do not depend upon resolution of said preceding floating point micro instruction.

8. The microprocessor as recited in claim 1, wherein, if said interlock logic determines that execution of the floating point exchange micro instruction sequence depends upon resolution of said preceding floating point micro instruction, said interlock control logic forwards said second location as said new target location for write back of a result of said preceding floating point micro instruction.

9. The microprocessor as recited in claim 8, wherein said target location modification logic provides said new target location to said preceding floating point micro instruction prior to said preceding floating point micro instruction writing back said result.

10. The microprocessor as recited in claim 1, wherein the floating point exchange micro instruction sequence proceeds to said register/control logic prior to said preceding floating point micro instruction writing back a result.

11. The microprocessor as recited in claim 1, wherein said target location modification logic is a 2-way mux.

12. The microprocessor as recited in claim 1, further comprising:

write back logic, coupled to said interlock logic, for receiving said new target location, and for negating write back of said second location during execution of the floating point exchange micro instruction sequence.

13. The microprocessor as recited in claim 12, wherein said write back logic stores a result of said preceding floating point micro instruction in said second location.

14. The microprocessor as recited in claim 13, wherein, during execution of the floating point exchange micro instruction sequence, said write back logic stores the contents of the second location in the first location.

15. A microprocessor for exchanging contents of two locations within a floating point register file, the microprocessor comprising:

register/control logic, for receiving a floating point exchange micro instruction sequence directing the microprocessor to exchange the contents of a first location and a second location within the floating point register file, and for determining that the contents of the first location depend upon resolution of a preceding floating point micro instruction, and for providing a signal indicating said dependency;

interlock logic, coupled to said register/control logic, for receiving said signal from said register/control logic, and for forwarding a new target location to said preceding floating point micro instruction if said signal indicates said dependency;

target location modification logic, coupled to said interlock logic, for receiving said new target location, and for providing said new target location to said preceding floating point micro instruction; and write back logic, coupled to said interlock logic, for receiving said new target location, for writing back a result of said preceding floating point micro instruction in said new target location, and for negating write back of said second location during execution of the floating point exchange micro instruction sequence;

wherein forwarding of said new target location by said interlock logic allows said floating point exchange micro instruction sequence to execute without resolution delay.

16. The microprocessor as recited in claim 15, wherein, if said interlock logic determines that execution of the floating point exchange micro instruction sequence depends upon resolution of said preceding micro instruction, said interlock control logic forwards said second location as said new target location for write back of a result of said preceding floating point micro instruction.

17. The microprocessor as recited in claim 15, wherein said target location modification logic is a 2-way mux.

18. The microprocessor as recited in claim 15, wherein, during execution of said floating point exchange micro instruction sequence, said write back logic stores the contents of the second location in the first location.

19. A floating point unit in a microprocessor for swapping contents of two floating point registers within a floating point register file, the floating point unit comprising:

dependency resolution logic, for receiving a floating point exchange micro instruction sequence directing the floating point unit to exchange contents of a dependent register with contents of a non-dependent register, for determining that said contents of said dependent location depend upon resolution of a preceding floating point micro instruction, and, if said contents of said dependent location depend upon resolution of a preceding floating point micro instruction, for forwarding a new target location to said preceding floating point micro instruction; and write back logic, coupled to said dependency resolution logic, for receiving said new target location, and for writing a result of said preceding floating point micro instruction to said new target location;

wherein said new target location is said non-dependent location, thereby allowing said floating point exchange instruction sequence to execute prior to resolution of said preceding floating point micro instruction.

20. The microprocessor as recited in claim 19, wherein said dependent location and said non-dependent location are within the floating point register file.

21. The microprocessor as recited in claim 20, wherein said contents of said dependent location are not available until said result of said preceding floating point micro instruction is written back into the floating point register file.

22. A method for executing a floating point exchange micro instruction sequence to exchange contents of two locations within a floating point register file, wherein the floating point exchange micro instruction sequence specifies a dependent location, and wherein the contents of the dependent location depend upon resolution of a preceding floating point micro instruction, the method comprising:

a) detecting execution of the floating point exchange micro instruction sequence;

b) retrieving contents of a non-dependent location from the floating point register file;

d) forwarding the non-dependent location as a new target address to the preceding floating point micro instruction;

e) during write back of the preceding floating point micro instruction, storing its results in the non-dependent location rather than the dependent location; and f) during write back of the floating point exchange micro instruction sequence, storing the contents of the non-dependent location in the dependent location;

wherein e) and f) allow execution of the floating point exchange micro instruction sequence to proceed without incurring resolution delay.

23. The method as recited in claim 22, wherein d) provides the new target address prior to write back of the preceding floating point micro instruction.

24. The method as recited in claim 22, wherein e) negates storage of the contents of the dependent location in the non-dependent location.

* * * * *